(12) United States Patent
Siraj et al.

(10) Patent No.: US 12,047,404 B2
(45) Date of Patent: Jul. 23, 2024

(54) METHOD TO PROVIDE SECURE OPERATION OF A LIGHTING NETWORK

(71) Applicant: SIGNIFY HOLDING B.V., Eindhoven (NL)

(72) Inventors: Muhammad Mohsin Siraj, Eindhoven (NL); Huon Urbald Ogier Norbert Van De Laarschot, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 354 days.

(21) Appl. No.: 17/299,543

(22) PCT Filed: Jan. 9, 2020

(86) PCT No.: PCT/EP2020/050351
§ 371 (c)(1),
(2) Date: Jun. 3, 2021

(87) PCT Pub. No.: WO2020/144248
PCT Pub. Date: Jul. 16, 2020

(65) Prior Publication Data
US 2022/0060496 A1    Feb. 24, 2022

(30) Foreign Application Priority Data

Jan. 10, 2019 (EP) .................................... 19151166

(51) Int. Cl.
*H04L 29/06* (2006.01)
*H04L 9/40* (2022.01)
(Continued)

(52) U.S. Cl.
CPC ...... *H04L 63/1433* (2013.01); *H04L 12/2818* (2013.01); *H04L 63/1425* (2013.01);
(Continued)

(58) Field of Classification Search
CPC ............. H04L 63/1425; H04L 63/1433; H04L 63/1441; H04L 12/2818; H05B 47/17
See application file for complete search history.

(56) References Cited

U.S. PATENT DOCUMENTS 8,135,946 B2   3/2012   Juen et al.
2015/0324185 A1   11/2015   Boehnel
(Continued)

FOREIGN PATENT DOCUMENTS

WO   2017141127 A1   8/2017

OTHER PUBLICATIONS

Huawei IoT Security White Paper, 2017 (29 Pages).
(Continued)

*Primary Examiner* — Brandon Hoffman
*Assistant Examiner* — Thong P Truong

(57) ABSTRACT

A method to provide secure operation of a lighting network, the lighting network comprising a lighting device arranged for illuminating an environment and a local controller for controlling the lighting device, wherein the lighting network is further controllable by an external controller, external to the lighting network, wherein the method comprises: determining a configuration status of the lighting network, analyzing the determined configuration status, switching an operational mode of the lighting network between a normal mode and a secured mode based on the analysis; wherein in the normal mode, the lighting network is operably connected to the external controller, and a light rendering function of the lighting device is being controlled by the external controller according to a predetermined set of functions, and wherein in the secured mode, the light rendering function of the lighting device is being controlled by the external controller according to a subset of the predetermined set of functions.

14 Claims, 5 Drawing Sheets

(51) Int. Cl.
*H04L 12/28* (2006.01)
*H05B 47/17* (2020.01)
*G16Y 30/10* (2020.01)
*G16Y 40/30* (2020.01)

(52) U.S. Cl.
CPC ......... *H04L 63/1441* (2013.01); *H05B 47/17* (2020.01); *G16Y 30/10* (2020.01); *G16Y 40/30* (2020.01)

(56) References Cited

U.S. PATENT DOCUMENTS

| | | |
|---|---|---|
| 2016/0081160 A1 | 3/2016 | Vangeel et al. |
| 2016/0189527 A1 | 6/2016 | Peterson et al. |
| 2016/0315955 A1* | 10/2016 | Beatty ................. H04L 63/1425 |
| 2018/0191738 A1 | 7/2018 | David et al. |

OTHER PUBLICATIONS

Markus Miettin, et al., "IoT Sentinel: Automated Device-Type Identification for Security Enforcement in IoT," IEEE 37th International Conference On Distributed Computing Systems, 2017 (8 Pages).

* cited by examiner

METHOD TO PROVIDE SECURE OPERATION OF A LIGHTING NETWORK

CROSS-REFERENCE TO PRIOR APPLICATIONS

This application is the U.S. National Phase application under 35 U.S.C. § 371 of International Application No. PCT/EP2020/050351, filed on Jan. 9, 2020, which claims the benefit of European Patent Application No. 19151166.6, filed on Jan. 10, 2019. These applications are hereby incorporated by reference herein.

FIELD OF THE INVENTION

The invention relates to a method to provide secure operation of a lighting network. The invention further relates to a controller and to a computer program product to provide secure operation of a lighting network.

BACKGROUND

Connected lighting refers to a system of one or more lighting devices which are controlled not by (or not only by) a traditional wired, electrical on-off or dimmer circuit, but rather by using a data communications protocol via a wired or more often wireless connection, e.g. a wired or wireless network. These connected lighting networks form what is commonly known as Internet of Things (IoT) or more specifically Internet of Lighting (IoL). Typically, the lighting devices, or even individual lamps within a lighting device, may each be equipped with a wireless receiver or transceiver for receiving lighting control commands from a lighting control device according to a wireless networking protocol such as Zigbee, Wi-Fi or Bluetooth.

IoT solutions such as connected lighting are complex networks of devices and sensors that exchange data and provide control functionality over networks and the cloud. With more and more data being exposed to more and more applications, security becomes a major challenge. The network devices such as connected lighting devices in a lighting network that have network connectivity are vulnerable.

Personal data that is collected by IoT lighting devices is of value to data hackers and identity thieves. Also, a cyberattack on IoT solutions has the potential to cripple physical services and lighting infrastructure. While the importance of IoT security is widely understood and agreed upon, the actual design and implementation of IoT security bring new challenges and opportunities. To improve security and reduce the risk of hacker attacks, different security measures such as using end-to-end cryptographic algorithms, providing security fixes and software updates are used.

US20160315955A1 discloses a method for detecting malicious behavior from smart appliances within a network. Network traffic data and identification data is collected about smart appliances within a network. The data is sent to a behavior analysis engine, which computes confidence levels for anomalies within the network traffic that may be caused by malicious behavior. Based on confidence levels, network traffic is blocked relating to the anomaly.

SUMMARY OF THE INVENTION

The inventors have realized that IoT devices, such as resource constrained lighting devices often have limited computing power and memory capacity, making it difficult to use complex cryptographic algorithms that require more resources than the lighting devices provide. The inventors have further realized that the update of IoT lighting devices with regular security fixes and updates are very often not performed on time. For example, in a home-based environment, users are either not aware of the need for updates or believe that updating is a difficult process which requires a trained technical person. It may become even more complicated in an office-based or an outdoor environment, where users may not have the authentication rights to perform the update (e.g. only the building or office manager may do so). Therefore, a large number of IoT lighting devices will operate with an old software (firmware) and may cause a security threat.

It is therefore an object of the present invention to overcome at least some of the problems raised above and other related network security problems and to provide secure operation of a lighting network, especially in view of the limitations of the lighting devices in the lighting network. In the context of the invention, as it is nearly impossible to provide an absolute secure operation with no risks, it should be understood that 'with secure operation', it is meant to provide an enhanced security of operation.

According to a first aspect, the object is achieved by a method to provide secure operation of a lighting network, the lighting network comprising a lighting device arranged for illuminating an environment and a local controller for controlling the lighting device, wherein the lighting network is further controllable by an external controller, external to the lighting network, wherein the method comprises: determining a configuration status of the lighting network, analyzing the determined configuration status, switching an operational mode of the lighting network between a normal mode and a secured mode based on the analysis; wherein in the normal mode, the lighting network is operably connected to the external controller, and a light rendering function of the lighting device is being controlled by the external controller according to a predetermined set of functions, and wherein in the secured mode, the light rendering function of the lighting device is being controlled by the external controller according to a subset of the predetermined set of functions.

The method provides enhanced security to the operation of the lighting network. The method comprises determining a configuration status of the lighting network. A configuration may comprise a functional arrangement of elements such as a software and/or hardware; wherein the configuration status may be a representation of some or all such elements such as version of the hardware, software and/or device settings. In an example, the software may be a firmware and the configuration status may be a version of the firmware. The determination of the configuration status may comprise determining the version of the software being used and/or the device settings of the lighting network. The configuration status of the lighting network may represent the configuration status of the lighting devices of the lighting network or of individual components of the lighting devices.

The method further comprises analyzing the determined configuration status of the lighting network. For example, the analysis on the determined configuration status may be performed in view of one or more of: whether the determined configuration status is, e.g. the latest version available for the software; whether the determined configuration status is vulnerable to a known security threat; whether network traffic shows signs of any malicious activity, such as malware operating in the network traffic. The analysis may be performed using anomaly detection in a network behavior analysis, which is a way to enhance the security of a network by monitoring traffic and noting unusual actions or departures from normal operation.

Based on the analysis, the method further comprises switching an operational mode of the lighting network between a normal mode and a secured mode. In the normal mode, the lighting network is operably connected to the external controller, and a light rendering function of the lighting device is being controlled by the external controller according to a predetermined set of functions. The predetermined set of functions may comprise illuminating an environment; and/or changing one or more of: color, color temperature, intensity, beam width, beam direction, illumination intensity, other parameters of one or more of light sources of the lighting devices.

In the secured mode, the light rendering function of the lighting device is being controlled by the external controller according to a subset of the predetermined set of functions. The subset of the predetermined set of function may comprise, e.g. illuminating the environment. In typical IoT systems, the operation of IoT devices is based on connectivity, e.g. connectivity to the internet, and disconnection from such an external network causes an operational failure for the complete system. It is different for the lighting network which can still operate locally in the secured mode with limited or no connectivity to the external controller. Therefore, the method provides secure operation of the lighting network, notwithstanding the limitations of the lighting devices in the lighting network.

In an embodiment, wherein the step of analyzing may comprise: detecting whether the determined configuration status requires a change; and wherein the method may further comprise: changing the configuration of the lighting network in the secured mode, switching the operational mode of the lighting network from the secured mode to the normal mode when the configuration is changed. The determined configuration status may require a change when the determined configuration status is indicative of an insecure operation of the lighting network.

An insecure operation may be indicative of a vulnerable operation of the lighting network to a security risk, e.g. when an anomaly is detected in network traffic and/or an indication is received about a vulnerability associated with the determined configuration status. The method, based on such detection, may comprise switching the operational mode of the lighting network, e.g. from the normal mode to the secured mode and may further comprise changing the configuration. The changing of the configuration may comprise updating, upgrading or downgrading configuration and/or change device settings. For example, updating firmware with a different version. The changing of the configuration may be performed by the external controller, e.g. in the secured mode. After the configuration has been changed, which is indicative of a secure operation of the lighting network, the operational mode of the lighting network may be switched to the normal mode. The operational mode may be switched to the normal mode for a predetermined test time period, e.g. to test the network security. If the network traffic is observed to be secured, e.g. no anomaly is found, the operational mode may be kept as the normal mode. Alternatively, the operational mode is switched back to the secured mode and a different configuration may be used.

In an embodiment, the changing of the configuration may be performed by the local controller, and wherein a required configuration may be stored in the local controller and the configuration of the lighting network may be changed based on said stored required configuration.

As an alternative to changing configuration via the external controller, the required configuration may be stored in the local controller. For example, the local controller may receive the required configuration, e.g. software and/or device settings, from the external controller and may store it in a memory. The local controller may be then arranged for changing the configuration of the lighting network, e.g. in the secured mode.

In the secured mode, the lighting network may be further arranged to be operably disconnected from the external controller and the lighting rendering function is being controlled by the local controller.

The lighting network may be further arranged to be operably disconnected from the external controller when any form of connection of the lighting network with the external controller may cause security risks. In this example, the subset of the predetermined set of functions is an empty set, i.e. the external controller does not control the light rendering function of the lighting devices. The local controller may be arranged for controlling light rendering function of the lighting device according to the subset of the predetermined set of functions, e.g. the local controller may be arranged for controlling the lighting device for illuminating the environment.

In the secured mode, information intended for the external controller may be stored in the local controller and said information may be communicated upon restoring of the normal mode. The lighting network may further comprise a sensing device, and wherein said information is one or more of: sensing data, status data, control data, configuration data, diagnostic data, maintenance requests, data processing requests.

Furthermore, the lighting network may further comprise a sensing device, a HVAC equipment, a fire alarm etc. These devices may need to communicate sensing signals or other signals with the external controller. This information may be intended for the external controller such that the information is processed, e.g. for control, maintenance, diagnostic, End-of-Life (EoL) analysis etc. The external controller may be located in a remote server, such as cloud, which offers computational advantages to process the information in the remote server. In the secured mode, information intended for the external controller may be stored in the local controller and said information is communicated upon restoring of the normal mode.

In the secured mode, the lighting network may be arranged for advertising a type of security hazard and/or the required configuration.

The lighting network, e.g. based on the analysis, may advertise the type of security hazard, e.g. certain anomaly detected, and/or the required configuration which may be best suited to address the vulnerability.

The step of determining the configuration status of the lighting network may be based on a trigger, and wherein the trigger generation may be time-based such that the trigger is generated periodically, at random time moments or at predetermined time moments.

The determination can be initiated based on a trigger such that the trigger may be timely generated, e.g. periodically, random etc. Such time-based trigger maintains a timely check on the configuration status and keeps the configuration status up-to-date.

The step of determining the configuration status of the lighting network may be based on a trigger, and wherein the trigger generation may be event-based such that the trigger may be generated when a malicious activity is observed in the lighting network.

Additionally, or alternatively the trigger may be generated based on an event. Examples of such events may include one or more of: when a malicious activity is observed in the lighting network, when the lighting devices start behaving in an unexcepted way, communication signals are dropped and/or rerouted to wrong destinations, lack or no control on the lighting devices.

The step of determining the configuration status of the lighting network may be based on a trigger, and wherein the trigger is generated when an update to the current configuration is available.

Additionally, or alternatively the trigger may be generated based on receiving an indication of the availability of an updated configuration, such that a user is made aware that the configuration is older and needs to be changed.

The analysis may be performed by using anomaly detection in a network behavior analysis and wherein the anomaly detection may use at least one of: a statistical method, a rule-based method, a distance-based method, a profiling-based method, a model-based method.

According to a second aspect, the object is achieved by a controller for providing secure operation of a lighting network, the lighting network comprising a lighting device arranged for illuminating an environment and a local controller for controlling the lighting device, wherein the lighting network is further controllable by an external controller, external to the lighting network, the controller comprising a processor for executing the method according to the first aspect. The controller may further comprise an input and output interface respectively and a memory. The input to the controller may be the trigger signal to initiate a determination according to the first aspect. The output of the controller may be an update signal to a user indicating that a configuration is changed. The memory may be used to store a required configuration.

According to a third aspect, the object is achieved by a computer program product comprising instructions configured to execute according to the first aspect, when executed on a controller according to the second aspect.

It should be understood that the computer program product and the system may have similar and/or identical embodiments and advantages as the above-mentioned methods.

BRIEF DESCRIPTION OF THE DRAWINGS

The above, as well as additional objects, features and advantages of the disclosed systems, devices and methods will be better understood through the following illustrative and non-limiting detailed description of embodiments of systems, devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

There are many open challenges with the security of IoT devices in an IoT system, such as lighting devices in a connected lighting system. Specifically, a common issue with the IoT lighting devices is that they are often resource-constrained such that they do not contain the computational resources necessary to implement advanced security measures such as end-to-end encryption techniques.

As mentioned, personal data that is collected by the IoT lighting devices is of value to data hackers and identity thieves. Also, a cyber-attack on IoT solutions has the potential to cripple physical services and lighting infrastructure. In a home-based environment, due to a security loophole, for instance, a user may lose control of the lighting devices of his/her home remotely, communication and/or control signals for the lighting devices may be dropped and/or rerouted to wrong destinations. Furthermore, the lighting devices may start behaving in an abnormal way, e.g. suddenly a lighting device is powered on with full brightness at night or a power outage of all the lighting devices in a user's home. In an extreme situation of a security breach, the lighting network may transmit the signals about a user presence/absence to unknown remote devices/server, resulting in a theft or other serious consequences.

In an office environment, a power outage may lead to several security issues. At any crowded location such as a theatre or a cinema, an abnormal behavior of the lighting devices such as power outage, abnormal flickering etc., may cause chaos within the crowd, leading to serious consequences. In a factory, where people are working such abnormality in the lighting devices may risk human lives. These are a few examples of such situations where the security of the connected lighting system is very imperative, and a security breach may lead towards financial consequences and even risk to human lives. Other examples may also be considered. The invention provides an enhanced security to the operation of a lighting network such that these security compromises can be avoided.

Figure 1:
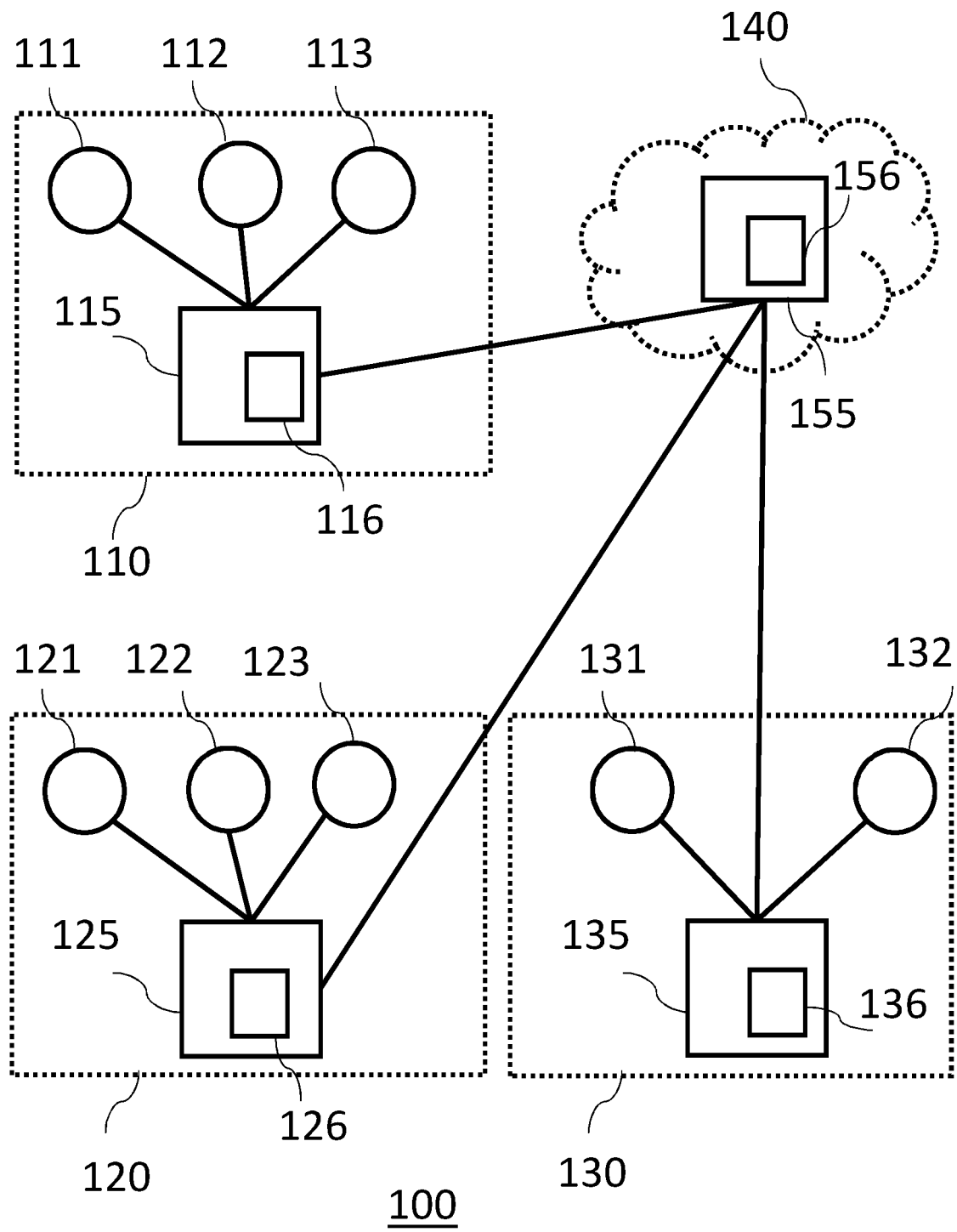
FIG. 1 shows schematically and exemplary a system comprising a lighting network and an external controller for providing secure operation of the lighting network.

FIG. 1 shows schematically and exemplary a system 100 comprising a lighting network 110. The lighting network 110, in this example, comprises three lighting devices 111-113. The lighting network 110 may comprise one or more lighting devices. A lighting device 111-113 is a device or structure arranged to emit light suitable for illuminating an environment, providing or substantially contributing to the illumination on a scale adequate for that purpose. A lighting device 111-113 comprises at least one light source or lamp, such as an LED-based lamp, gas-discharge lamp or filament bulb, etc., optionally any associated support, casing or other such housing. Each of the lighting devices 111-113 may take any of a variety of forms, e.g. a ceiling mounted luminaire, a wall-mounted luminaire, a wall washer, or a free-standing luminaire (and the luminaires need not necessarily all be of the same type).

The lighting network 110 further comprises a local controller 115 and a communication unit 116 which is exemplary shown to be comprised in the local controller 115. However, the communication unit 116 can be external to the local controller 115. The communication unit 116 can be a gateway which is used to receive and transmit communication signals to and from the lighting network 110. A gateway is a piece of networking hardware used for networks that allows data to flow from one discrete network to another. The lighting network 110 may, for instance, further comprise (not shown in the figure) a sensing device, a fire alarm, a HVAC equipment for heating, ventilation and cooling etc. The sensing device may include motion sensors (such as PIR sensors), light sensors for detecting ambient light levels, temperature sensors, humidity sensors, gas sensors such as $CO_2$ sensors, particle measurement sensors, audio sensors and imaging sensors such as cameras. Different combinations of multiple sensor types are possible, depending on the application or situation.

The local controller 115 may be arranged for controlling the operation of the lighting devices 111-113. The local controller 115 may be a switch, e.g. a legacy wall switch. The local controller 115 may be a sensing device, e.g. a temperature sensor, a presence sensor, and may be arranged for generating a sensing signal, wherein the lighting devices 111-113 may be arranged to be controlled based on the generated sensing signal. The local controller 115 may be arranged for controlling the lighting devices 111-113 via wired means or a wireless means, e.g. by using a wireless protocol such as Wi-Fi, Bluetooth or Zigbee etc. The local controller 115 may be a computer software which may be based on programmed rules. The local controller 115 may be implemented in each of the lighting device 111-113. The local controller 115 may be implemented external to the lighting device 111-113.

The local controller 115 may further comprise a processor (not shown) and a memory (not shown), wherein the local controller 115 may be provided in a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc.

The system 100 may further comprise external networks 120 and 130, external to the lighting network 110. These networks 120-130 are exemplary shown as lighting networks but they may be other forms of networks, e.g. computer networks. The external network 120 comprises three lighting devices 121-123, a controller 125, and a communication unit 126 which is exemplary shown to be comprised in the controller 125. However, the communication unit 126 can be external to the local controller 125. The communication unit 126 can be a gateway which is used to receive and transmit communication signals to and from the external network 120. The external network 130 comprises two lighting devices 131-132, a controller 135, and a communication unit 136 which is exemplary shown to be comprised in the controller 135. However, the communication unit 136 can be external to the local controller 135. The communication unit 136 can be a gateway which is used to receive and transmit communication signals to and from the external network 130. The external networks 120-130 may, for instance, further comprise (not shown) a sensing device, a HVAC equipment (not shown) for heating, ventilation and cooling etc.

The system 100 may further comprise an external controller 155 and a communication unit 156 which is exemplary shown to be comprised in the external controller 155. The external controller 155 is external to the lighting network 110. The external controller 155, in this exemplary figure, is shown to be located in a remote server 140. The external controller 155 may be located in the external networks 120-130. The external controller 155 via the communication unit 156 is arranged for communicating with the lighting network 110 and the external networks 120-130. In this exemplary figure, the external networks 120-130 is arranged for communicating with the lighting network 110 via the external controller 155. Alternatively, or additionally, the lighting network 110 may have a direct communication link with the external networks 120-130.

In an example, the system 100 may be situated in a building, for instance, an office, a residential complex, a shopping mall, a grocery store, a cinema, a theatre, a factory etc. The lighting network 110 may be located in a room of the building. The external networks 120-130 may be located in other rooms of the building. The external controller 155 may be located in the remote server 140, for instance, on a user device such as mobile phone, laptop or tablet etc., cloud, internet etc. The external controller 155 may be a building management system (BMS), otherwise known as a building automation system (BAS), which is a computer-based control system installed in buildings that controls and monitors the building's mechanical and electrical equipment such as ventilation, lighting, power systems, fire systems, and security systems.

In another example, the system 100 may be situated in an outdoor environment, e.g. in a town or a city. The example of such a system 100 is Philips CityTouch which is a street lighting management comprising smart street lights. The lighting network 110 may be located in a town of a city and may comprise lighting devices 111-113, e.g. as streetlights. The external networks 120-130 may be located in other towns of the city. The external controller 155 may be located in the remote server 140, such as a software system to remotely monitor, control and manage street lightings.

As the lighting network 110 may have a network connectivity with the external controller 155 and the external networks 120-130, causing it to be vulnerable to security threats. A cyber-attack on the lighting network 110 and/or the external networks 120-130 has the potential to cripple physical services and lighting infrastructure. Specifically, in view that the lighting devices 111-113 have limited computing power and memory capacity, making it difficult to use complex cryptographic algorithms that require more resources than the lighting devices 111-113 can provide. The objective of the present invention is to present a method to provide secure operation of the lighting network 110, wherein the method is schematically and exemplary illustrated in FIG. 2.

Figure 2:
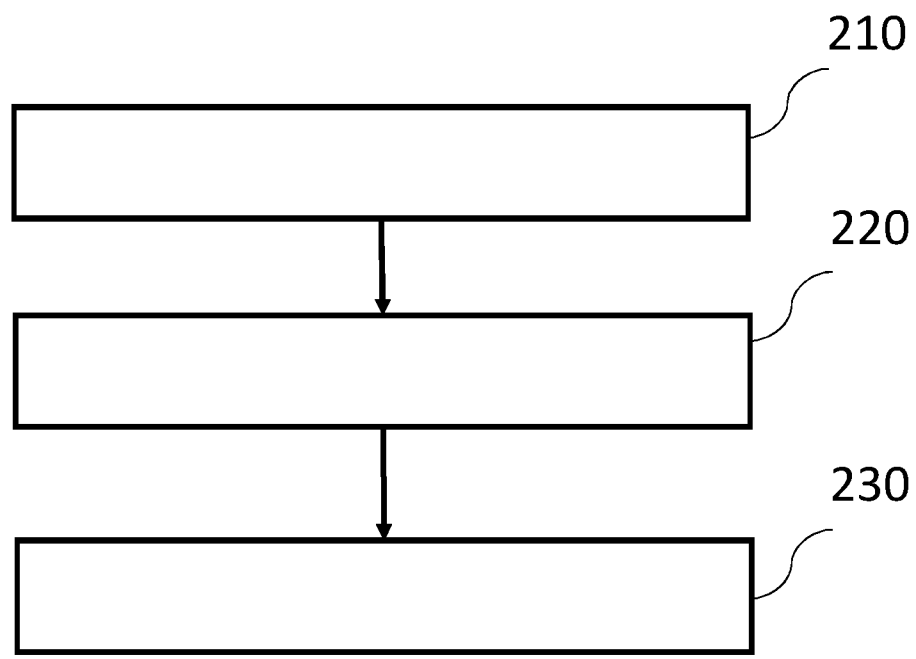
FIG. 2 shows schematically and exemplary a flowchart illustrating an embodiment of a method of providing secure operation of the lighting network.

FIG. 2 shows schematically and exemplary a flowchart illustrating an embodiment of a method 200 of providing secure operation of the lighting network 110. In the determining step 210, a configuration status of the lighting network 110 is determined. The determination of the configuration status may comprise determining the version of the software being used or the values of the device settings of the lighting network. The determination 210 may be performed in the external controller 155 and/or in the local controller 115. The configuration status of the lighting network 110 may be the configuration status of the lighting devices 111-113 of the lighting network 110. The configuration status of the lighting network 110 may be the configuration status of individual components of the lighting devices 111-113, e.g. driver, networking chip (transceiver), microcontroller etc. The configuration status of the lighting network 110 may be the configuration status of the local controller 115 or any other elements in the lighting network 110. The configuration status of the lighting network 110 reads onto any of the above case.

A configuration may comprise a functional arrangement of elements such as a software and/or hardware; wherein the configuration status may be a representation of some or all such elements such as version of the hardware, software and/or device settings. The configuration may comprise a software or data stored in the lighting network 110; wherein the configuration status is, e.g. a version of the software or the values of the configuration parameters. The configuration may be a firmware of the lighting network 110, wherein the configuration status may be the version of the firmware. Firmware is a permanent software programmed into a read-only memory of the lighting network 110, wherein the method 200 further comprises determining 210 the current version of the firmware. The configuration may be data such as configuration parameters and/or device settings, e.g. the lighting device may be configured to allocate a specific size of memory for a certain light rendering function.

The step of determining 210 the configuration status of the lighting network 110 may be based on a trigger, and wherein the trigger generation may be time-based such that the trigger is generated periodically, at random time moments or at predetermined time moments. The predetermined time-moments for trigger generation may be set by a user or it may be automatically generated based on historic data from the lighting network 110. The trigger generation may be event-based such that the trigger may be generated when a malicious activity is observed in the lighting network. The network traffic may be monitored for detecting any malicious activity, e.g. a malware is operating in the network traffic. Malware is any software intentionally designed to cause damage to a network. Malware models are generated which for the tell-tale signs of known and unknown malware, malicious tools, and zero-day exploits that attackers use to get an initial foothold in the network. The malicious activity may be observed by using anomaly detection from the lighting network 110. Visualization tools may be used to monitor the network traffic. When the system detects any such malicious activity, the trigger to determine the configuration status of the lighting network 110 may be generated. Alternatively, the event may be a recent cyberattack on a similar network or an information about a potential cyber-attack due to a vulnerable configuration.

The trigger may be generated when an indication of the availability of an updated configuration, e.g. software and/or device settings, is received. The updated configuration is usually provided in a patch, which is a set of changes to the configuration designed to update, fix, or improve it. This includes fixing security vulnerabilities and other bugs, with such patches usually being called bugfixes or bug fixes and improving the usability or performance.

The method 200 may further comprise analyzing 220 the determined configuration status. The analysis 220 of the determined configuration status may be based on the vulnerability of the lighting network 110. The analysis 220 can be performed in the external controller 155 and/or in the local controller 115. The analysis 220 is performed by using anomaly detection in a network behavior analysis. Network Behavior Analysis (NBA) is a way to enhance the security of a network by monitoring traffic and noting unusual actions or departures from normal operation. Conventional intrusion prevention system solutions defend a network's perimeter by using packet inspection, signature detection and real-time blocking. NBA programs watch what's happening inside the network, aggregating data from many points to support offline analysis. After establishing a benchmark for normal traffic, the NBA program passively monitors network activity and flags unknown, new or unusual patterns that might indicate the presence of a threat.

The anomaly detection, e.g. in NBA, may use at least one of: a statistical method, a rule-based method, a distance-based method, a profiling-based method, a model-based method, as explained below:

Statistical methods: statistical methods monitor the user or system behavior by measuring certain variables over time (e.g. login and logout time of each session in intrusion detection domain). The basic models keep averages of these variables and detect whether thresholds are exceeded based on the standard deviation of the variable. More advanced statistical models also compare profiles of long-term and short-term user activities.

Distance-based methods: distance-based approaches attempt to overcome limitations of statistical outlier detection approaches and they detect outliers by computing distances among points. Several distance-based outlier detection algorithms are used for detecting anomalies in network traffic.

Rule-based methods: rule-based systems used in anomaly detection characterize normal behavior of users, networks and/or computer systems by a set of rules.

Profiling-based methods: in profiling methods, profiles of normal behavior are built for different types of network traffic, users, programs etc., and deviations from them are considered as intrusions.

Model-based methods: in the model-based approaches, anomalies are detected as deviations for the model that represents the normal behavior.

The method 200 may further comprise switching 230 an operational mode of the lighting network 110 between a normal mode and a secured mode based on the analysis 220.

In the normal mode, the lighting network 110 is operably connected to the external controller 155, and a light rendering function of the lighting devices 111-113 is being controlled by the external controller 155 according to a predetermined set of functions. The external controller 155 may control the light rendering function of one or more lighting devices 111-113. The predetermined set of functions may comprise illuminating an environment, and/or changing one or more of: color, color temperature, intensity, beam width, beam direction, illumination intensity, other parameters of one or more of light sources of the lighting devices 111-113. In the normal mode, the external controller 155 may change the configuration status of the lighting network 110. In normal mode, the lighting network 110 may be arranged for communicating information, for example, sensing data, status data, control data, configuration data, diagnostic data, maintenance requests, data processing requests, with the external controller 155. The information is intended for the external controller 155 such that the information is processed, for instance, for control, maintenance, diagnostic, End-of-Life (EoL) analysis etc. The external controller 155 may be located in the remote server 140, such as cloud, which offers computational advantages to process the information in the remote server 140.

In the secured mode, the light rendering function of the lighting devices 111-113 is being controlled by the external controller 155 according to a subset of the predetermined set of functions. For example, the subset of the predetermined set of function may comprise illuminating the environment and/or changing illumination intensity. As an example, in the secured mode, the lighting network 110 may only be arranged for communicating with the external controller 155 but may not be arranged for communicating with the external networks 120-130. As another example, in the secured mode, the information intended for the external controller 155 may be stored in the local controller 115 and said information is communicated upon restoring of the normal mode. The information may be processed locally in the local controller 115. The lighting network may be arranged for advertising a type of security hazard and/or a required configuration. Based on the analysis 220, the local controller 115 may advertise the vulnerability the lighting network 110 is exposed to and/or the potential configuration which may address the vulnerability. In networks, security fixes, e.g. patches, are used to change the configuration status. Although patches are meant to fix problem of security vulnerability, poorly designed patches can sometimes introduce new problems. Therefore, the local controller 115 may advertise that a previous or different patch is suitable.

In the secured mode, the lighting network 110 may be further arranged to be operably disconnected from the external controller 155 and the light rendering function may be controlled by the local controller 115. In this example, the subset of the predetermined set of functions is an empty set, i.e. the external controller 155 does not control the light rendering function of the lighting devices 111-113. The empty set or null set is the unique set having no elements. In this example, the lighting network 110 may be disconneted from the external network(s) 120-130 as well, whether the communication of the lighting network 110 with external networks 120-130 may be direct or via the external controller 155. The local controller 115 may be arranged for controlling the operation of the lighting devices 111-113. The lighting network 110 may not communicate information, for example, sensing data, status data, control data, configuration data, diagnostic data, maintenance requests, data processing requests, with the external controller 155. The information intended for the external controller 155 may be stored in the local controller 155 and the information may be processed, for instance, for control, maintenance, diagnostic, End-of-Life (EoL) analysis etc., locally in the local controller 115. The local controller 115 may perform a subset of information processing such as control and maintenance. The information may be communicated in the normal mode. In the example of system 100 being a building, the local controller 115 may be a switch in a room which is arranged for controlling the light rendering functions of the lighting devices 111-113. The external controller 155, e.g. building central control and the external networks 120-130, e.g. lighting networks in other rooms, in this example, are disconnected from the lighting network 110.

Figure 3:
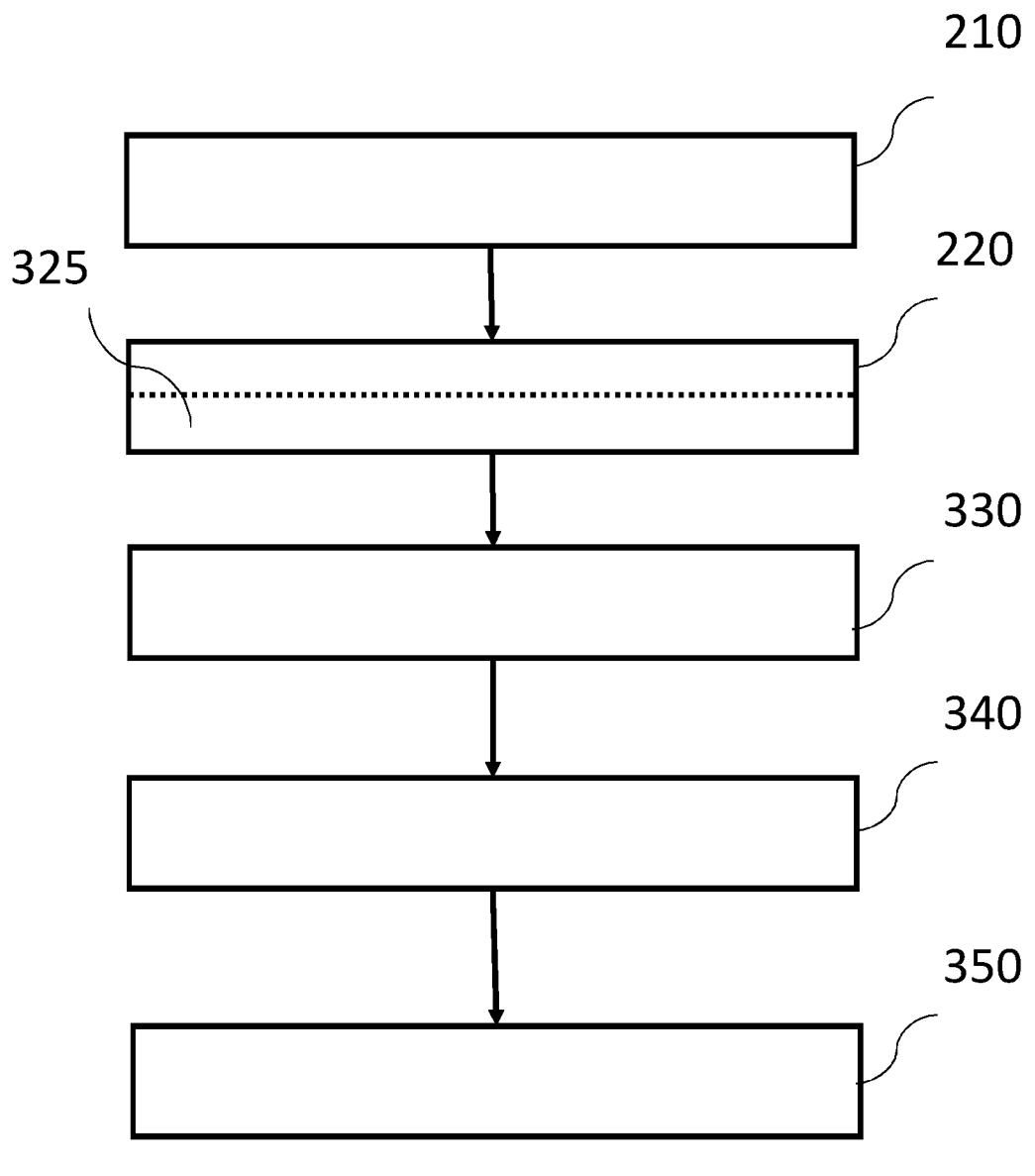
FIG. 3 shows schematically and exemplary a flowchart illustrating another embodiment of a method of providing secure operation of the lighting network.

FIG. 3 shows schematically and exemplary a flowchart illustrating another embodiment of a method 300 of providing secure operation of the lighting network. In the determining step 210, a configuration status of the lighting network 110 is determined and the determined configuration status is analyzed in step 220, wherein the analysis 220 comprises: detecting 325 whether the determined configuration status requires a change. The determined configuration status may require a change when it is detected that the lighting network is vulnerable, for instance when an anomaly is detected in the network traffic, a newer configuration compared to the determined configuration is available, the determined configuration status is known to be an under-performing configuration and exposed to security risks etc. In case of anomaly, the network traffic is monitored for detecting any malicious activity, e.g. a malware is operating in the network traffic.

The local controller 115 and/or the external controller 155 may receive an indication of the availability of an updated configuration. In the step of detecting 325, the determined configuration status may be compared with the available configuration status. For example, the configuration may be the firmware, and the version of installed firmware is compared to the presently available version of the firmware. If the installed firmware is an older version, the detecting step 325 indicates that the configuration requires a change. Alternatively, for instance, a bug is found in the determined configuration such that it renders the lighting network 110 vulnerable to security breach, the detecting step 325 indicates that the configuration status requires a change.

The method 300 may further comprise switching 330 the operational mode of the lighting network from the normal mode to the secured mode based on the detection 325. In the step 340, the configuration of the lighting network 110 is changed. In case, when the presently available configuration is newer compared to the determined configuration, the configuration of the lighting network 110 is updated. When a malicious activity is detected, the configuration may be changed to a more suitable version providing security to the detected malicious activity. Also, in case when it is indicated that the determined configuration status is prone to security vulnerability, the configuration may be changed to a different configuration, e.g. newer or older, which provides better security and is not vulnerable. The change of the configuration may be performed by the local controller 115 and/or by the external controller 155. The process of changing the configuration is schematically and exemplary shown in FIG. 4.

The method 300 may further comprise switching 350 the operational mode from the secured mode to the normal mode when the configuration is changed. Ones the potential security threats are treated and the vulnerabilities of the lighting network 110 to security compromises are addressed, the lighting network 110 is switched back to the normal mode. The lighting network 110 may be kept in the normal mode for a test period of time, and the network traffic is strictly observed. If the vulnerabilities are not completely addressed, the lighting network 110 may be again switched back to the secured mode for, e.g. to use a different configuration.

Figure 4:
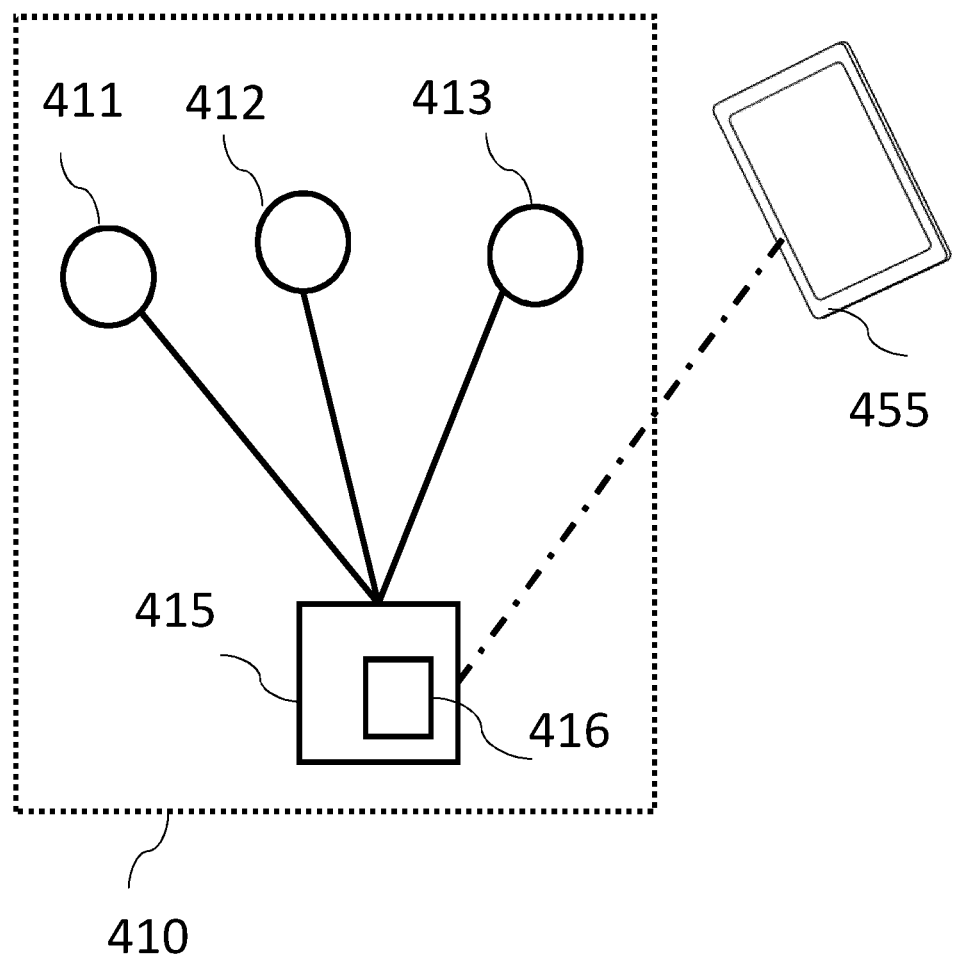
FIG. 4 shows schematically and exemplary a lighting network and a local controller illustrating an embodiment to change the configuration of the lighting network.

FIG. 4 shows schematically and exemplary a lighting network 410 and a local controller 415 illustrating an embodiment to change the configuration of the lighting network 410. The lighting network 410 may comprise lighting devices 411-413, a local controller 415, and a communication unit 416 shown exemplary to be comprised in the local controller 415. The change of configuration may be automatic, e.g. based on a trigger, or manual, e.g. based on a user input. In an embodiment, the configuration of the lighting network 410 may be changed via the local controller 415, which may be arranged for receiving and storing the configuration. The local controller 415 may be arranged for receiving the configuration in the normal mode and may be arranged for changing the configuration of the lighting network 410 in the normal mode. Alternatively, local controller 415 may be arranged for receiving the configuration in the normal mode and may be arranged for changing the configuration of the lighting network 410 in the secured mode. Further, local controller 415 may be arranged for receiving and changing the configuration in the secured mode.

Alternatively, the external controller 455 may be arranged for changing the configuration of the lighting network 410. The external controller 455 in this exemplary figure is shown to be located in a user device 455, e.g. a mobile phone, tablet, laptop, with a user interface to indicate the availability of the configuration and to change the configuration. The external controller 455 may be connected to a remote server, e.g. internet, to receive configuration. The external controller 455 may be operably connected to the communication unit 416 of the lighting network 410. In an embodiment, the external controller 455 may be wirelessly connected to the communication unit 416, which includes a wireless transceiver and provides communication over radio frequency, using a protocol such as Wi-Fi, Bluetooth or Zigbee. The configuration may be changed in the normal mode or in the secured mode via the external controller 455.

In the example of system 100 being a building. The external controller 455, which in this example is a user mobile device is connected to a Wi-fi network and receives a configuration such as a software. The mobile device communicates with the communication unit 416, e.g. a gateway, for instance, over the Wi-fi link and indicates the availability of the configuration. In case when the configuration status of the lighting devices 411-413 is determined which requires a change, the gateway communicates with the lighting devices 411-413, e.g. over the Zigbee link. The mobile device changes the configuration of the lighting devices 411-413 via the gateway of the lighting network 416. In an embodiment, the mobile device may require a authentication to change the configuration status. The authentication may require one or more of: a password, a pin code, fingerprints etc. The authentication may be a single-factor or multi-factor authentication. The local controller may be comprised in a local user device (not shown) which may have communication link, e.g. wireless or wired, with the lighting devices 411-413. The local user device may receive configuration such a software, e.g. in a normal mode, and may change the configuration of the lighting devices 411-413, e.g. in a secured mode.

Figure 5:
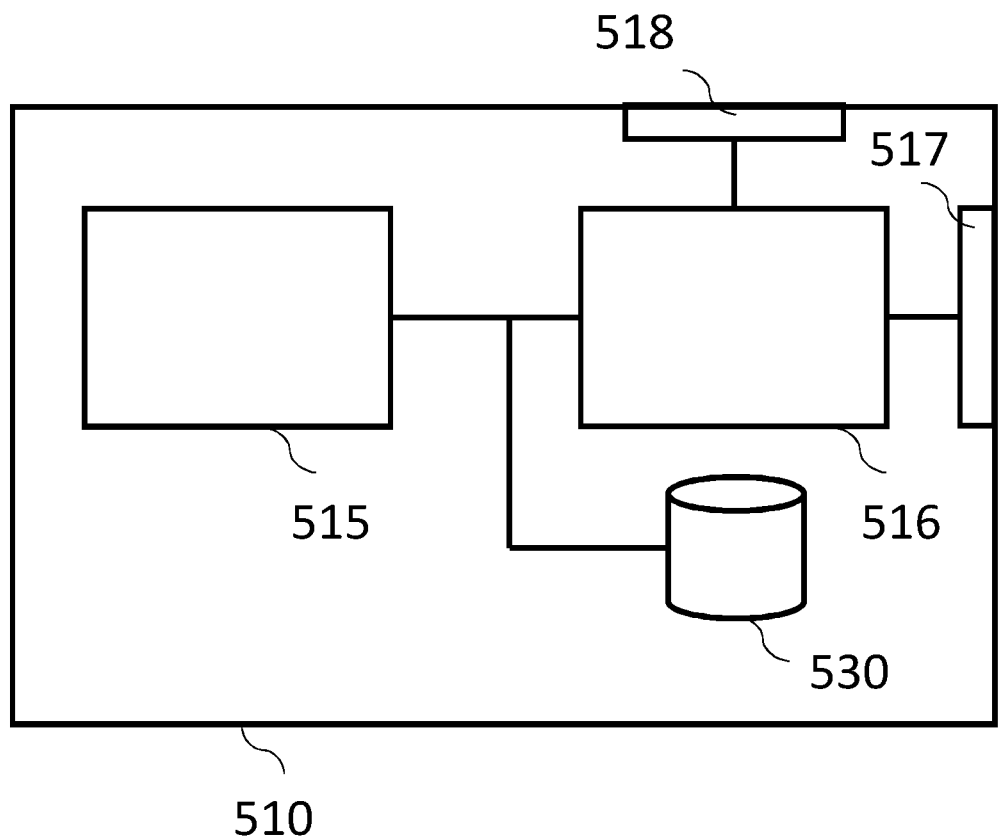
FIG. 5 shows schematically and exemplary a controller for providing secure operation of the lighting network.

FIG. 5 shows schematically and exemplary a controller 510 for providing secured operation of the lighting network. The local controller 510 may comprise a processor 515, a communication unit 516, an input and output interface 517-518 respectively and a memory 530. The processor 515 is arranged for executing the steps of the method 200-300. The controller 510 may be implemented in a unit separate from the lighting network 110 and/or external controller 155, such as wall panel, desktop computer terminal, or even a portable terminal such as a laptop, tablet or smartphone. Alternatively, the controller 510 may be incorporated into the lighting network 110 or external controller 155. Further, the controller 510 may be implemented in a single unit or in the form of distributed functionality distributed amongst multiple separate units (e.g. a distributed server comprising multiple server units at one or more geographical sites, or a distributed control function distributed amongst the lighting network 110 or amongst the lighting network 110 and external controller 155). Furthermore, the controller 510 may be implemented in the form of software stored on a memory (comprising one or more memory devices) and arranged for execution on a processor (comprising one or more processing units), or the controller 510 may be implemented in the form of dedicated hardware circuitry, or configurable or reconfigurable circuitry such as a PGA or FPGA, or any combination of these.

The method 200-300 may be executed by computer program code of a computer program product when the computer program product is run on a processing unit of a computing device, such as the processor 515 of the controller 510.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A method to provide secure operation of a lighting network, the lighting network comprising a lighting device arranged for illuminating an environment and a local controller for controlling the lighting device, wherein the lighting network is further controllable by an external controller, external to the lighting network, wherein the method comprises:

determining a configuration status of the lighting network, wherein a configuration comprises a functional arrangement of elements of the lighting network, and the configuration status comprises a version of a hardware, software and/or device settings of some or all of the elements;

analyzing the determined configuration status, and detecting whether the determined configuration status requires a change, wherein the analysis of the determined configuration status is based on vulnerability of the lighting network;

switching an operational mode of the lighting network between a normal mode and a secured mode based on the analysis, and switching the operational mode of the lighting network from the normal mode to the secured mode based on the detection;

changing the configuration of the lighting network in the secured mode, including updating, upgrading or downgrading configuration and/or changing device settings; and switching the operational mode of the lighting network from the secured mode to the normal mode after the configuration is changed;

wherein in the normal mode, the lighting network is operably connected to the external controller, and a light rendering function of the lighting device is being controlled by the external controller according to a predetermined set of functions, and wherein in the secured mode, the light rendering function of the lighting device is being controlled by the external controller according to a subset of the predetermined set of functions.

2. The method according to claim 1, wherein the determined configuration status requires a change when the determined configuration status is indicative of an insecure operation of the lighting network.

3. The method according to claim 1, wherein the changing of the configuration is performed by the external controller.

4. The method according to claim 1, wherein the changing of the configuration is performed by the local controller, and wherein a required configuration is stored in the local controller and the configuration of the lighting network is changed based on said stored required configuration.

5. The method according to claim 1, wherein in the secured mode, the lighting network is further arranged to be operably disconnected from the external controller and the lighting rendering function is being controlled by the local controller.

6. The method according to claim 5, wherein in the secured mode, information intended for the external controller is stored in the local controller and said information is communicated upon restoring of the normal mode.

7. The method according to claim 6, wherein the lighting network further comprises a sensing device, and wherein said information is one or more of: sensing data, status data, control data, configuration data, diagnostic data, maintenance requests, data processing requests.

8. The method according to claim 1, wherein in the secured mode, the lighting network is arranged for advertising a type of security hazard and/or the required configuration.

9. The method according to claim 1, wherein the step of determining the configuration status of the lighting network is based on a trigger, and wherein the trigger generation is time-based such that the trigger is generated periodically.

10. The method according to claim 1, wherein the step of determining the configuration status of the lighting network is based on a trigger, and wherein the trigger generation is event-based such that the trigger is generated when a malicious activity is observed in the lighting network.

11. The method according to claim 1, wherein the step of determining the configuration status of the lighting network is based on a trigger, and wherein the trigger is generated when an update to the current configuration is available.

12. The method according to claim 1, wherein the analysis is performed by using anomaly detection in a network behavior analysis and wherein the anomaly detection uses at least one of: a statistical method, a rule-based method, a distance-based method, a profiling-based method and a model-based method.

13. A controller for providing secure operation of a lighting network, the lighting network comprising a lighting device arranged for illuminating an environment and a local controller for controlling the lighting device, wherein the lighting network is further controllable by an external controller, external to the lighting network, wherein the controller comprising:
an input and an output interface;
a communication unit;
a memory; and
a processor configured to:
determine a configuration status of the lighting network, wherein a configuration comprises a functional arrangement of elements of the lighting network, and the configuration status comprises a version of a hardware, software and/or device settings of some or all of the elements;
analyze the determined configuration status, and detect whether the determined configuration status requires a change, wherein the analysis of the determined configuration status is based on vulnerability of the lighting network;
switch an operational mode of the lighting network between a normal mode and a secured mode based on the analysis, and switch the operational mode of the lighting network from the normal mode to the secured mode based on the detection;
change the configuration of the lighting network in the secured mode, including updating, upgrading or downgrading configuration and/or changing device settings; and
switch the operational mode of the lighting network from the secured mode to the normal mode after the configuration is changed, wherein in the normal mode, the lighting network is operably connected to the external controller, and a light rendering function of the lighting device is being controlled by the external controller according to a predetermined set of functions, and wherein in the secured mode, the light rendering function of the lighting device is being controlled by the external controller according to a subset of the predetermined set of functions.

14. A non-transitory computer readable medium comprising instructions which, when the instructions are executed by a computer, cause the computer to carry out the steps of:
determining a configuration status of the lighting network, wherein a configuration comprises a functional arrangement of elements of the lighting network, and the configuration status comprises a version of a hardware, software and/or device settings of some or all of the elements;
analyzing the determined configuration status, and detecting whether the determined configuration status requires a change, wherein the analysis of the determined configuration status is based on vulnerability of the lighting network;
switching an operational mode of the lighting network between a normal mode and a secured mode based on the analysis, and switching the operational mode of the lighting network from the normal mode to the secured mode based on the detection;
changing the configuration of the lighting network in the secured mode, including updating, upgrading or downgrading configuration and/or changing device settings; and
switching the operational mode of the lighting network from the secured mode to the normal mode after the configuration is changed;
wherein in the normal mode, the lighting network is operably connected to the external controller, and a light rendering function of the lighting device is being controlled by the external controller according to a predetermined set of functions, and wherein in the secured mode, the light rendering function of the lighting device is being controlled by the external controller according to a subset of the predetermined set of functions.

\* \* \* \* \*